United States Patent
Brunet et al.

(10) Patent No.: US 11,438,405 B2
(45) Date of Patent: Sep. 6, 2022

(54) EFFICIENT FILE ROUTING SYSTEM

(71) Applicant: LiveQoS Inc., Ottawa (CA)

(72) Inventors: Stephane Brunet, Ottawa (CA);
Martin William Horne, Woodlawn (CA); Miika Anttoni Klemetti, Kanata (CA)

(73) Assignee: Adaptiv Networks Inc., Gatineau (CA)

( * ) Notice: Subject to any disclaimer, the term of this patent is extended or adjusted under 35 U.S.C. 154(b) by 69 days.

(21) Appl. No.: 16/205,391

(22) Filed: Nov. 30, 2018

(65) Prior Publication Data

US 2019/0104170 A1 Apr. 4, 2019

Related U.S. Application Data

(63) Continuation of application No. 15/083,442, filed on Mar. 29, 2016, now Pat. No. 10,218,772, which is a continuation-in-part of application No. 15/053,065, filed on Feb. 25, 2016, now abandoned.

(51) Int. Cl.
| | |
|---|---|
| *H04L 67/06* | (2022.01) |
| *H04L 67/1004* | (2022.01) |
| *H04L 69/14* | (2022.01) |
| *H04L 67/63* | (2022.01) |

(52) U.S. Cl.
CPC .......... *H04L 67/06* (2013.01); *H04L 67/1004* (2013.01); *H04L 67/63* (2022.05); *H04L 69/14* (2013.01)

(58) Field of Classification Search
None
See application file for complete search history.

(56) References Cited

U.S. PATENT DOCUMENTS

| | | | | |
|---|---|---|---|---|
| 6,426,955 | B1* | 7/2002 | Gossett Dalton, Jr | H04L 29/06 370/352 |
| 6,477,582 | B1* | 11/2002 | Luo | H04L 47/16 709/241 |
| 6,728,712 | B1* | 4/2004 | Kelley | H04L 61/30 707/827 |
| 7,840,703 | B2* | 11/2010 | Arimilli | H04L 45/125 370/254 |
| 9,203,872 | B2* | 12/2015 | Gunnalan | H04L 65/1069 |
| 9,641,579 | B2* | 5/2017 | Gouache | H04L 65/60 |
| 2002/0095489 | A1* | 7/2002 | Yamagami | G06F 11/2094 709/224 |
| 2003/0172163 | A1* | 9/2003 | Fujita | H04L 67/1008 709/226 |

(Continued)

*Primary Examiner* — Brian Whipple
(74) *Attorney, Agent, or Firm* — Stratford Group Ltd.

(57) ABSTRACT

A method or system for efficiently routing a file located on two or more sources to one or more file recipients connected by a plurality of paths in one or more networks. For each file recipient, one or more predetermined utility functions are evaluated to select the most efficient one of the plurality of paths to use for routing the file to the one or more file recipients, and the file is routed to the one or more file recipient using the selected path. The predetermined utility function may be the estimated operating expense associated with the routing of the file to the one or more file recipients, or the estimated return on investment for improving the routing of said file to the one or more recipients, or is related to an estimated file transfer time to the one or more file recipients.

20 Claims, 4 Drawing Sheets

(56) References Cited

U.S. PATENT DOCUMENTS

| | | | |
|---|---|---|---|
| 2004/0010588 A1* | 1/2004 | Slater | H04N 21/23103 709/224 |
| 2004/0073640 A1* | 4/2004 | Martin | H04L 41/0896 370/351 |
| 2008/0222684 A1* | 9/2008 | Mukraj | H04L 67/1012 725/86 |
| 2010/0094986 A1* | 4/2010 | Zuckerman | H04L 67/101 709/219 |
| 2010/0220596 A1* | 9/2010 | Hubbard | H04L 45/00 455/445 |
| 2013/0041936 A1* | 2/2013 | Ohtake | H04L 67/1002 709/203 |
| 2015/0200992 A1* | 7/2015 | Houdaille | H04L 67/2852 709/219 |

* cited by examiner

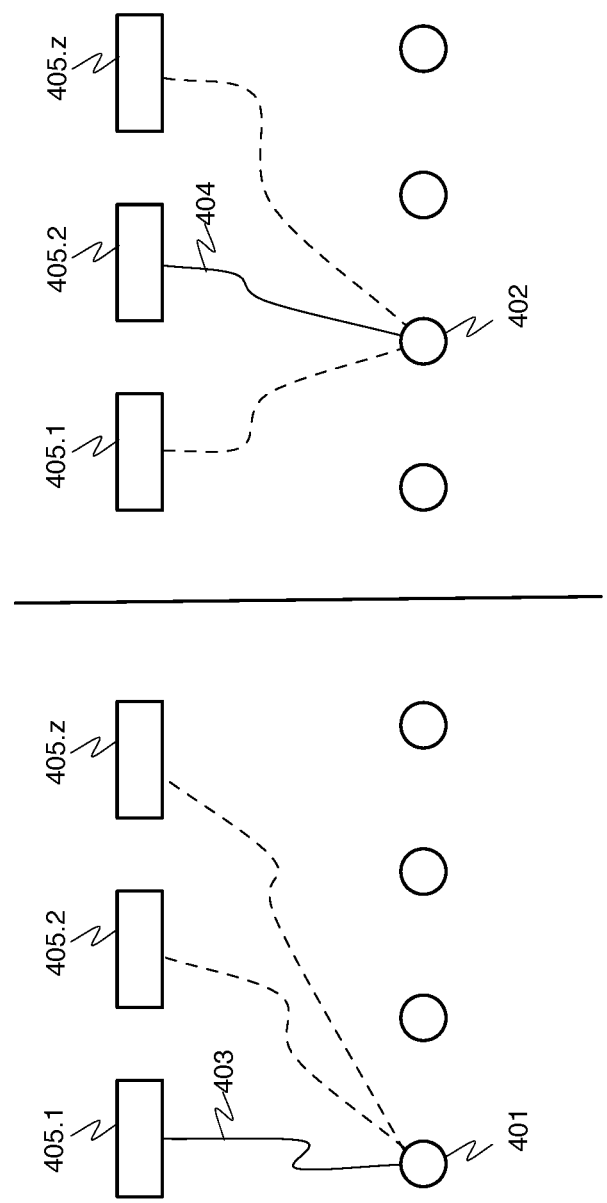

EFFICIENT FILE ROUTING SYSTEM

CROSS-REFERENCE TO RELATED APPLICATIONS

This application is a continuation of U.S. patent application Ser. No. 15/083,442, filed Mar. 29, 2016, now allowed, which is a continuation-in-part of and claims priority to U.S. patent application Ser. No. 15/053,065, filed Feb. 25, 2016, now abandoned, which is hereby incorporated by reference herein in its entirety.

FIELD OF THE INVENTION

The present disclosure relates to communication data networks and their use in the efficient transmission of large data files from a source to one or more recipients.

BRIEF SUMMARY

In accordance with one embodiment, a method is provided for efficiently routing a file located on two or more sources to one or more file recipients connected by a plurality of paths in one or more networks. The method evaluates, for each file recipient, one or more predetermined utility functions to select the most efficient one of the plurality of paths to use for routing the file to the one or more file recipients, and routes the file to the one or more file recipient using the selected path. The predetermined utility function is preferably the estimated operating expense associated with the routing of the file to the one or more file recipients, or the estimated return on investment for improving the routing of said file to the one or more recipients relative to using another of said one or more path, or is related to an estimated file transfer time to the one or more file recipients.

In one implementation, the evaluating comprises one or more scaling factor to adjust the relative importance between two or more utility functions, such as a utility function based on quality of experience for a given file transfer, or on expected transfer bitrate for a given file transfer.

A system may be used to record a plurality of historical utility metrics associated with the routing of said file to the one or more file recipients. The evaluating may be done probabilistically based on said historical metrics.

Another implementation may include balancing a load between each of the most efficient one of the plurality of paths for the one or more file recipients.

In accordance with another embodiment, a system is provided for efficiently routing a file located on two or more sources to one or more file recipients connected by a plurality of paths in one or more networks. The system includes a module coupled with each of the file recipients to evaluate one or more predetermined utility functions to select a most efficient one of the plurality of paths to use for routing the file to the one or more file recipients. The module effects the routing of the file to the one or more file recipients using said the selected paths. The predetermined utility function is preferably the estimated operating expense associated with the routing of said file to the one or more file recipients, or the estimated return on investment for improving the routing of the file to the one or more recipient relative to using another of said one or more paths, or a utility functions related to an estimated file transfer time to the one or more file recipients. The evaluating may include one or more scaling factors to adjust the relative importance between two or more utility functions.

In one implementation, the utility function is based on the quality of experience for a given file transfer, or on expected transfer bit rate for a given file transfer.

The system may be used to record a plurality of historical utility metrics associated with the routing of the file to the one or more file recipients. The evaluating may be done probabilistically based on the historical metrics. The system may include balancing a load between each of the most efficient one of the plurality of paths for each of the file recipients.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 4 is a diagrammatic illustration of the possible paths for the first two of multiple file recipients.

Figure 1:
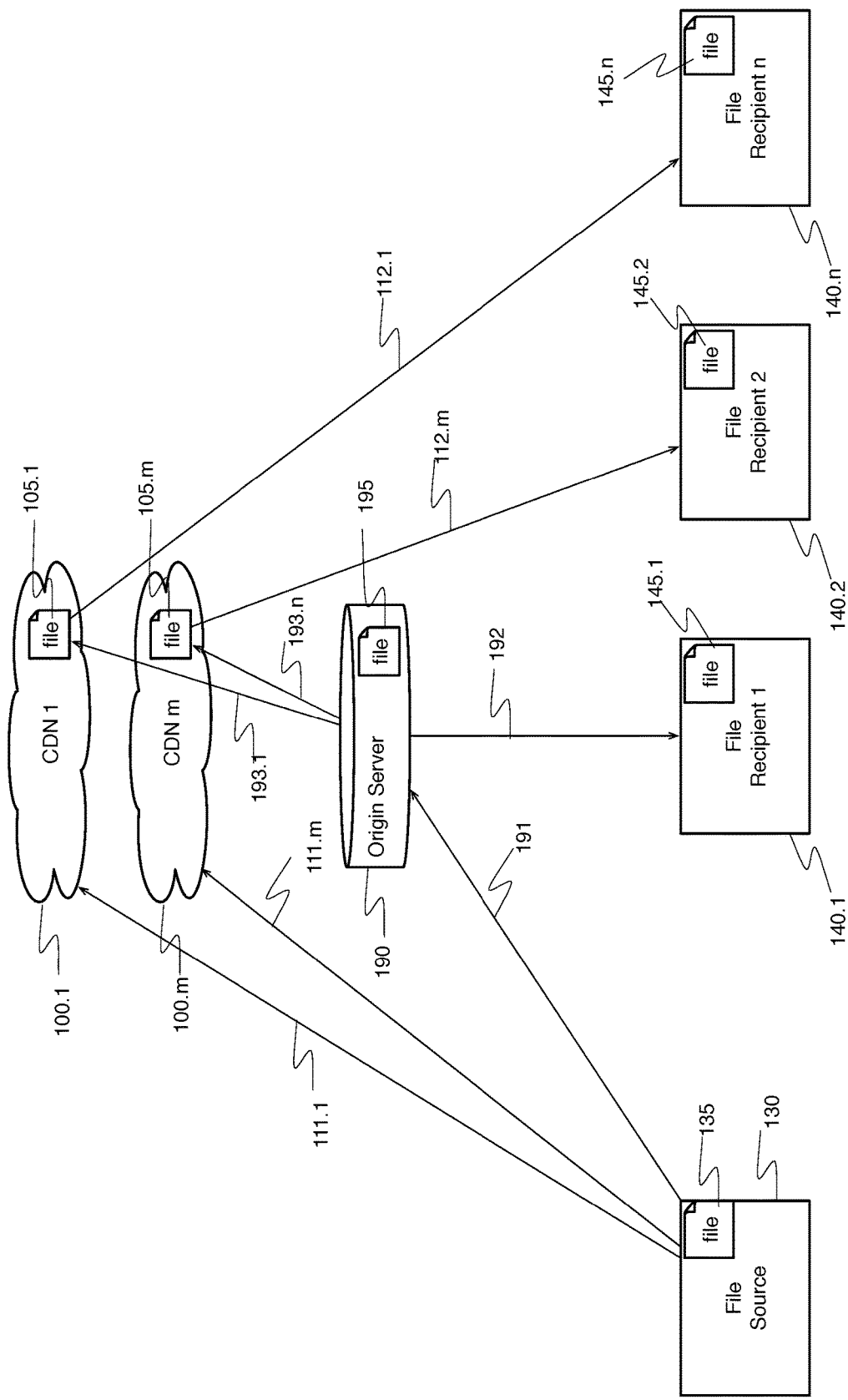
FIG. 1 is a diagrammatic illustration of a network topology for sharing files in the prior-art using an origin server (such as a web server) and one or more Content Delivery Networks (CDNs).

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 depicts the current state of the art for file sharing over a network where one or more recipients 140.1 ... 140.n require a file 135 which originates at a file source 130 and is stored at an origin server 190 and possibly one or more Content Delivery Networks (CDNs) 100.1 ... 100.m. A file is used herein as a generic term comprising any type of content or shared numerical resource, such as a web page content, a digital movie, etc. File sources 130 and file recipients 140.1 ... 140.n are computing platforms, such as personal computers, servers, laptops or mobile devices. File recipients require contents of a file which are created and possibly updated a plurality of times at the file source 130. It should be understood that a file source can also be a file recipient and vice versa. The origin server 190 is a server that contains the original file.

In the absence of CDNs, the file source 130 transmits the file directly 191 to an origin server 190 to create a copy 195.

The file recipients 140.1 ... 140.*n* can then request the file directly 192 from origin server 190.

Each time the file is updated or modified, the file source 130 re-transmits the file 130 to the origin server.

As the numbers of file sources and file recipients grow, the load on the origin server increases and slows performance. Performance issues are further aggravated by longer distances and larger files when these recipients are spread over a large geographic area.

A CDN 100.1 ... 100.*m* is a globally distributed network of proxy servers deployed in multiple data centers. The goal of a CDN is to serve content to end-users with high availability and high performance. The use of CDN generally involves contractual agreements based on the amount of bandwidth and/or storage used. Some contracts may include a fixed monthly fee for a minimum amount of bytes used and a variable fee based on the number of bytes used that exceed the minimum amount. The fixed and variable fee can be quite high depending on the type of CDN. Typically, CDNs are meant to be used when there is a large community of users sharing medium-size files. When the number of users sharing the file is smaller and the files are extremely large (e.g., movies), the use of CDNs may not always be the optimal sharing solution.

Content Delivery Networks (CDNs) offer an alternative by storing cached copies of the files 130 on a plurality of servers spread over a large geographic area. In this case, either the file source 130 sends the file 135 directly 111.1 ... 111.*m* to one or more CDNs 100.1 ... 100.*m* or the origin server 190 sends its copy of the file 195 directly 193.1 ... 193.*m* to the CDNs. Each CDN is then responsible for distributing the file across its own collection of servers.

When a file recipient 140.1 ... 140.*n* requests the file 135, the request is redirected to an appropriate CDN (choice may be based on location) which responds directly 112.1 ... 112.*m* with a local copy of the file 105.1 ... 105.*m*.

Since the CDN uses a large number of servers at varying locations in the world that are sharing the task of serving this file, the response times are significantly improved over the case where the origin server 190 is solely responsible for delivering the file to all recipients. As mentioned above, the use of CDNs involves significant costs associated with both the storage and distribution of files.

Figure 2:
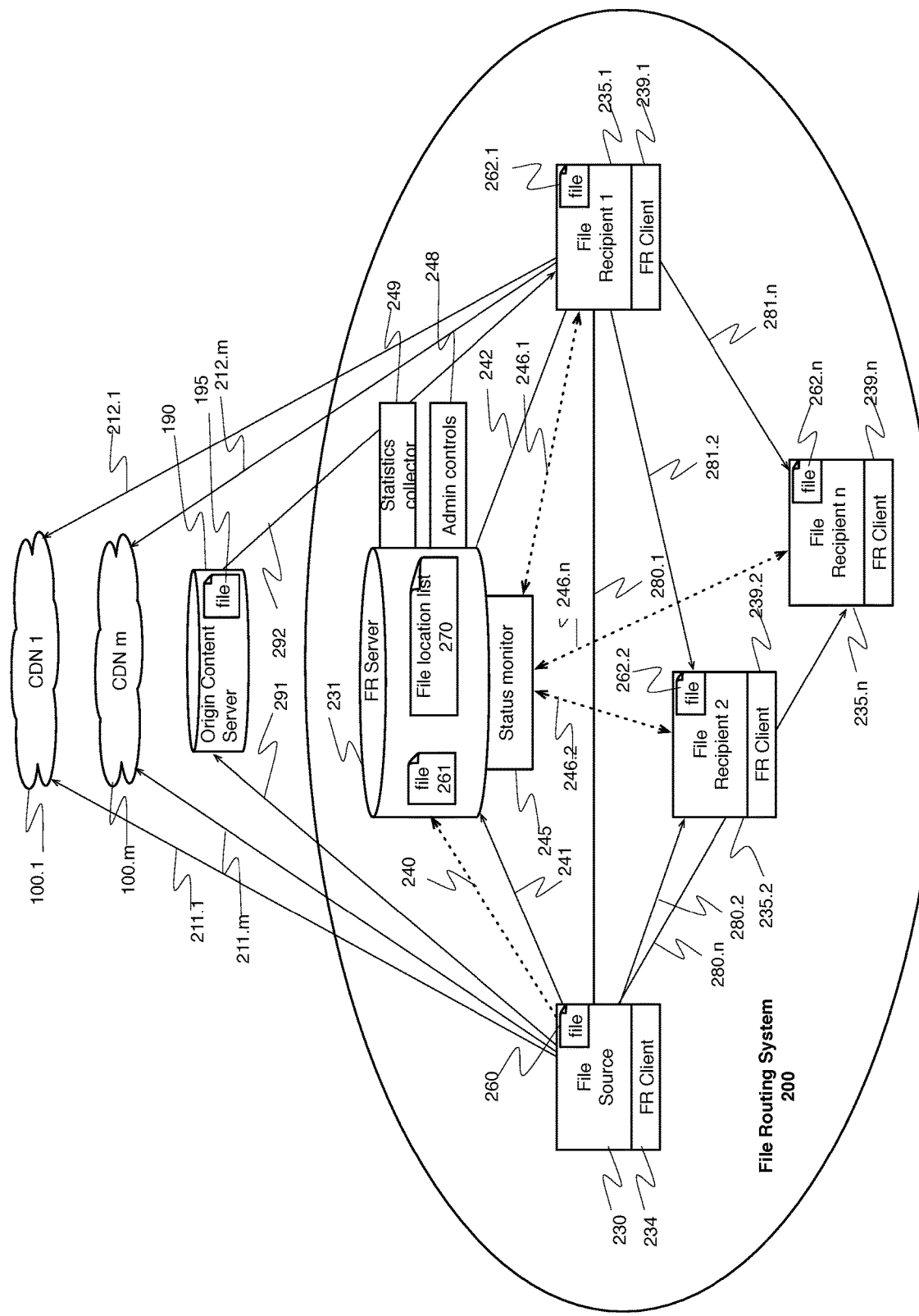
FIG. 2 is a diagrammatic illustration of a network topology for sharing files using an origin content server (such as a web server), one or more Content Delivery Networks (CDNs) and a file routing system that includes file recipients.

FIG. 2 depicts a network topology that includes a file routing system 200 to improve file transfer performance and reduce costs associated with using CDNs.

The file routing system 200 domain comprises one or more file router servers 240, one or more computing platforms acting as file sources 230 equipped with a client software 234 and one or more computing platforms acting as file recipients 235.1 ... 235.*n* also equipped with a client software 239.1 ... to 239.*n*. In addition, the file routing system 200 maintains a file location list 270 which provides a cross-reference of each file along with the network addresses of all nodes (file sources and file recipients) within the system that have a stored copy of the file. The system uses a status monitor 245 which ascertains whether file recipients are presently active on the network using bidirectional network messaging 246.1 ... 246.*n*. A statistic collector module 249 may also be used to monitor the performance of the system and optionally adjust parameters. An administration control module 248 is also provided to configure the system parameters and optimization criteria, such as the utility and cost functions used for the multi-constraint optimization as described herein.

The file routing system 200 is designed to optimize the performance and minimize costs for each file transfer and for each recipient or group of recipients based on a set of criteria comprising, for example, one or more of file size, number of recipients, locations of recipients, availability of recipient (as established by the status monitor 245), speed of transfer, cost and security. The system may vary the cost of using the CDNs with time of month based on the amount of bandwidth used on the CDN. For example, if the CDN contract has a minimum bandwidth usage of 1 TB at a fixed price, then as the month goes by, the system attempts to make sure the 1 TB is all used but not exceeded.

If the recipient is currently available, then the file source 230 may be instructed, if this is the most optimal option based on the criteria, to send the file directly to the recipient using one of several Peer-to-Peer (P2P) protocols known in the art 280.1 ... 280.*n* resulting in copies of the files in each recipient 235.1 ... 235.*n*.

If deemed more efficient based on the criteria, updated copies of the file in recipients may then be further transmitted using a P2P protocol from one file recipient to another instead of from the file source (paths depicted as 281.1 ... 281.*n*).

Another possible option, if the file routing server 240 itself is, for example, within the same Local Area Network (LAN) or Wide Area Network (WAN), then the source 230 may be directed to send 241 the file to the file routing server 240 where it can be more efficiently retrieved by some of the intended recipients.

If the file is sent directly to the recipient 235.1 ... 235.*n*, the copy of the file 265 on the origin server 190 may also be updated at a lower priority by either the file source 230 or a file recipient 235.1 ... 235.*n*, allowing any other file recipient to retrieve the file 260.

Based on the criteria, it may be established that it would be more optimal to use the origin server 190 and/or one or more of the CDNs 100.1 to 100.*m*. The file source 230 would then update a copy of its file 260 on any number of these delivery systems. Subsequently, any file recipients can then retrieve the file 260.

The file routing system 200 then updates the file location list 270 to reflect all file transfers.

As there may be a plurality of copies and corresponding paths for a file recipient to retrieve a copy of a required file, the file routing system 200 uses a statistics collector 249 to compile data on, for example, network usage, bandwidth consumed for each CDN and occupancy of the origin server.

Figure 3:
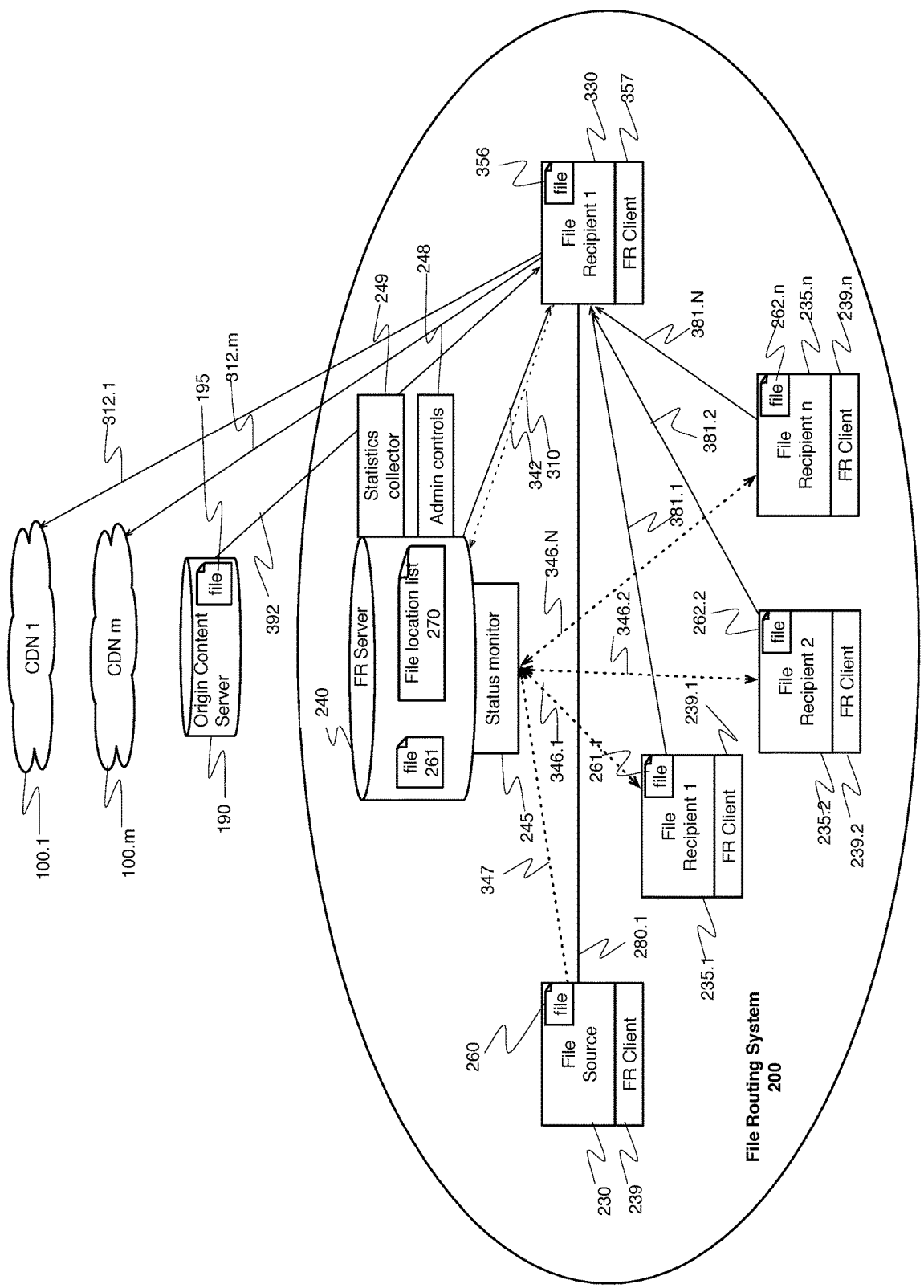
FIG. 3 depicts a reverse path in the network topology of FIG. 2 whereby a recipient first requests content and the file routing system selects an optimal source to send the file.

FIG. 3 shows a similar embodiment as shown in FIG. 2, but in this case, a file recipient 350 makes a request for the file 260 which originated at file source 230 but has already been distributed to existing file recipient 235.1 ... 235.*n*, and to the origin server 190 and possibly to one or more CDNs 100.1 ... 100.*m*. In this case the file recipient 350 first sends a network request 310 for the file 260. The file may have already been updated to the file routing server 240, to an origin content server 290 or to any number of CDNs 100.1 ... 100.*m*. The file routing server 240 refers to the file location list 270 as well as a set of criteria to determine an optimal path on which to send a copy of the file to to recipient 350.

Upon the initial request for file 260 (implemented as a network message), the file routing system assesses the criteria to determine the optimal path for the file transfer for each receiver. The process for determining the optimal path is the same as described above.

As described above, it may be using a P2P protocol from the original source 230 via network path 380, from a previous recipient 235.1 ... 235.*n*, from the file routing server 240, or the origin server 190. As before, the choice is made according to the criteria.

If a file recipient requests a file that is in the process of being transferred, the file recipient may retrieve the partial file from one location (e.g., origin server) and get the rest of the file using a more efficient path (e.g., P2P).

Optionally, the file routing system 200 may only be used to route files of a size exceeding a pre-determined threshold while the files of smaller size are routed using a fixed path.

The file routing system may prepare plans (criteria, thresholds, etc.) offline using linear programming optimization/simulation based on historical usage data. The plan is periodically loaded into the file routing system to update the criteria and the optimization algorithm.

Network performance enhancement protocols (NPEC) such as TCP acceleration protocols well known in the art, such as the ones described in U.S. Pat. Nos. 8,630,204 and 9,143,454 and other layer 3 acceleration protocols as described in U.S. Pat. Nos. 8,437,370, 9,189,307, 7,742,501, 8,548,003, 9,953,114 and 8,009,696 may be used to improve the performance of one or more of the network paths 211.1 ... 211.m, 241, 280.2 ... 280.m, 212.1 ... 212.m, 291, 292. The file routing system may take into account whether one or more NPEC are enabled on one or more path as one of or more of the criteria to establish the optimal path.

One embodiment for establishing the optimal path is now described.

Let set S comprise all possible sources for a given file. For this example, the term "source" refers to an origin server, one or more CDNs, and file sources:

$$S=\{OriginServer, CDN_1, CDN_2, \ldots, source_N\}.$$

The goal is to find a subset of sources S'<S that maximizes collective utility for a number of file recipients accessing the file.

In one embodiment, an exponential utility U function is used:

$$U=e^{\alpha C^{ROI}-C^{OPEX}},$$

where $C^{ROI}$ is the estimated return on investment from improving transfer times, $C^{OPEX}$ is the increase in associated operating expenses, and a is a scaling factor to adjust the relative importance between the two. Depending on the implementation, the sign of either cost measure may be either positive or negative, where $C^{OPEX}$ and $C^{ROI}$ depend on the choice of S' and can be expanded as the sum of individual transfers to and from the sources i in S', $$C^{OPEX}=\Sigma_{i\in S'}\Sigma_{j\in Z_i}C_{ij}^T P_{ij}+\Sigma_{i\in S'}C_i^R,$$

and where index j runs over all file recipients $Z_i$ potentially using source i, $P_{ij}$ is the prior probability of file recipient j choosing the source i, $C_{ij}^T$ is the estimated cost of outbound traffic from source i to file recipient j, and $C_i^R$ is the cost of data replication for source i (i.e., inbound traffic and storage). In some implementations $C_{ij}^T$ and $C_i^R$ may also depend on the average or burst bit rates experienced by each source, and may be based on instantaneous values or expected monthly averages.

In one implementation, $C^{ROI}=(-1)C^{Time}$ is used to estimate the loss of revenue due to file recipient dissatisfaction due to longer file transfer times. In a simplified implementation described below, $C^{Time}$ is taken to be proportional to the transfer time experienced by the file recipients. In this format U is conveniently bounded between $U\in(0,1]$, where maximal utility is achieved in an ideal scenario of zero increased operating cost and zero time spent by file recipients.

The total cost due to transfer time may then be summed over all file recipients, $$C^{Time}=\sum_j^{Z_i} C_{ij}^{Time},$$

where i is understood to indicate the source $i\in S$ chosen by the file recipient, and $$C_{ij}^{Time}=\beta bitrate^{-1}=\beta RTT_{ij}\sqrt{P_{ij}},$$

where β is a scaling factor that may be characterized empirically relating the cost to expected transfer bit rate estimated by Mathis limit, and RTT and p stand for round-trip time and packet loss rate respectively between the file recipient and the chosen source.

Since $C_{ij}^{Time}$ may be calculated between the file recipient and all possible sources $i\in S$, below it is understood that $C_j^{Time}$ for the minimal cost possible given the available sources S'

$$C_j^{Time}=\min_{i\in S'}(C_{ij}^{Time}).$$

In another implementation multiple possible sources are initially selected by the file recipient, whose individual costs are weighted by the probability of choosing them $$C_j^{Time}=\min_{i_1,i_2 531\ S'}(C_{i_1j}^{Time}P_{i_1j}+C_{i_2j}^{Time}P_{i_2j}),$$

where two potential sources i and j are considered. This is convenient for establishing a probabilistic load balancing scheme to distribute traffic across multiple sources.

Due to linearity of the terms, the logarithm of the utility can be expressed as sum of costs incurred by individual file recipients, plus a term relating to the resource replication between sources $$\ln U = (-1)(C^{OPEX}+\alpha C^{Time})=$$

$$(-1)\sum_j^Z \left(\sum_{i\in S'}C_{ij}^T P_{ij}+\alpha C_j^{Time}\right) - \sum_{i\in S'} C_i^R = (-1)\sum_j^Z C_j^{cli} - \sum_{i\in S'} C_i^R,$$

As the number of file recipients increases, the cost of resource replication between sources becomes negligible. Further, some CDN providers to not charge for this type of traffic. With this reduction, log-utility simplifies to sum of cost contributions from each file recipient j $$\ln U=(-1)\Sigma_j^Z C_j^{cli},$$

$$C_j^{cli}=\Sigma_{i\in S'}C_{ij}^{Tx}P_{ij}+\alpha C_j^{Time}.$$

Maximal utility is achieved for the subset S' yielding minimum sum of file recipient costs $$U_{max}\Leftrightarrow \min_{S'\in S}(\Sigma_j^Z C_j^{cli}),$$

which may be solved numerically by permuting over possible subsets S'⊆S. Since the number of sources is typically up to Θ(10), this task is computationally feasible.

In one embodiment, the sum over file recipient costs can be maintained simultaneously for each S' in a dynamic fashion. Consider the full set $S_1 \subseteq S$ as a starting point that gives the maximal $C^{OPEX}$ and minimal $C^{Time}$, and log-utility $$\ln U_1=(-1)(\Sigma_j^Z C_j^{cli})_{S_1}.$$

Also, consider the log-utility for a subset $S_1 \subseteq S$, with source i=1 removed.

$$lnU_2 = (-1)(\Sigma_j^Z C_j^{cli})_{S_2},$$

which differs from ln $U_0$ due to file recipients for which optimal source i=1 is absent $$lnU_0 - lnU_1 = \sum_j^Z (\Delta C_j^{cli})_{S_1 \to S_2}$$

$$= \sum_j^N \Delta_{1j}.$$

Generalizing to all W possible subsets $S_1 \subseteq S$, these deltas are expressed as a vector $$\Delta = [\Delta_1, \Delta_2, \Delta_3, \ldots, \Delta_W], = \sum_j^Z [\Delta_{1j}, \Delta_{2j}, \Delta_{3j}, \ldots, \Delta_{Wj}],$$

where the sum is taken across all known file recipient transfers. As new transfers are introduced, the vector $\Delta$ can be updated by summing the new contributions $$\Delta_{Z-1} \to \Delta_{Z-1} + [\Delta_{1Z}, \Delta_{2Z}, \Delta_{3Z}, \ldots \Delta_{WZ}].$$

At any given time, a lookup in $\Theta(W)$ can be performed to query the minimum $\Delta_i$ yielding the subset $S_i$ with the maximized utility.

FIG. 4 depicts an example, with an initial start consisting of a full set of three available sources $S_1 = \{s_1, s_2, s_3\}$ 405.1 . . . 405.Z where Z=3. All possible combinations of sources are hence $S_2 = \{s_2, s_3\}$, $S_3 = \{s_1, s_3\}$, $S_4 = \{s_1, s_2\}$, $S_5 = \{s_1\}$, $S_6 = \{s_2\}$ and $S_7 = \{s_3\}$.

The expected contribution to the total cost is calculated for each four transfers. These calculations are repeated for all possible sources. FIG. 4 shows the possible paths for the first two file recipients 401, 402, where the solid line 403, 404 represents the preferred lowest cost path chosen here purely based on distance from file recipient to source 405.1 . . . 405.Z.

For each file recipient, we can express the estimated cost in a vector form having one element for each possible source. For example for file recipient 1:

$$C_1 = [C_{s_11}, C_{s_21}, C_{s_31}] = [0, \Delta C_{s_21}, \Delta C_{s_31}].$$

These costs are used to get a more convenient cost vector spanning all possible subsets of sources $$\Delta C_1^{cli} = [\Delta_{11}, \Delta_{21}, \Delta_{31}, \Delta_{41}, \Delta_{51}, \Delta_{61},$$

$$\Delta_{71}] = [\min(0, \Delta C_{s_21}, \Delta C_{s_31}), \min(\Delta C_{s_11}, \Delta C_{s_31}), \min(0, \Delta C_{s_31}),$$

$$\min(0, \Delta C_{s_21}), 0, \Delta C_{s_21}, \Delta C_{s_31}] = [0, \Delta C_{s_21}, 0, 0, 0, \Delta C_{s_21}, \Delta C_{s_31}],$$

where the $\Delta_{i1}$ understood to mean the minimum costs for file recipient 1 given sources $S_i$. Repeating this exercise for other file recipients:

$$\Delta C_2^{cli} = [0, 0, \Delta C_{s_12}, 0, \Delta C_{s_12}, 0, \Delta C_{s_32}],$$

$$\Delta C_3^{cli} = [0, 0, \Delta C_{s_33}, 0, \Delta C_{s_13}, 0, \Delta C_{s_33}],$$

$$\Delta C_4^{cli} = [0, 0, 0, \Delta C_{s_34}, \Delta C_{s_14}, \Delta C_{s_24}, 0].$$

Finally, summing up the columns across all file recipients, the total cost for each subset is obtained:

$$\Delta = \sum_j^4 [\Delta_{1j}, \Delta_{2j}, \Delta_{3j}, \Delta_{4j}, \Delta_{5j}, \Delta_{6j}, \Delta_{7j}], = [0,$$

$$\Delta C_{s_21}, (\Delta C_{s_12} + \Delta C_{s_33}), \Delta C_{s_34}, (\Delta C_{s_12} + \Delta C_{s_13} + \Delta C_{s_14}),$$

$$(\Delta C_{s_21} + \Delta C_{s_24}), (\Delta C_{s_31} + \Delta C_{s_32} + \Delta C_{s_33})],$$

from which the subset (element of the vector) with minimized cost can be picked.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for routing one or more files located on one source to a plurality of file recipients coupled by a plurality of paths in one or more networks comprising:
   maintaining a file location list for said one or more files, wherein one or more network addresses of said source and said file recipients are stored in said file location list;
   monitoring a presently active status of said plurality of file recipients, using bi-directional messaging between said file routing systems and one or more computing platforms acting as said file recipient;
   evaluating for each of the plurality of file recipients a plurality of predetermined utility functions to determine a most efficient of said plurality of paths to use for routing one of said one or more files to each of said plurality of file recipients with active file status; and
   routing one of said one or more files to each of the plurality of file recipients using said most efficient of said plurality of paths and updating said file location list to reflect said routing.

2. The method of claim 1 wherein one of the utility functions is the estimated operating expense associated with said routing of one of said one or more files to each of said file recipients.

3. The method of claim 1 wherein one of the utility functions is the estimated return on investment for improving said routing of one of said one or more files to each recipient relative to using another of said one or more path.

4. The method of claim 1 wherein one of the utility functions is related to an estimated file transfer time to each of said file recipients.

5. The method of claim 4 wherein said utility function is based on quality of experience for a given file transfer.

6. The method of claim 4 wherein said utility function is based on expected transfer bitrate for a given file transfer.

7. The method of claim 1 wherein said evaluating comprises one or more scaling factor to adjust the relative importance between two or more utility functions.

8. The method of claim 1 wherein a system is used to record a plurality of historical utility metrics associated with the routing of one of said one or more files to each of said file recipients.

9. The method of claim 8 wherein said evaluating is done probabilistically based on said historical metrics.

10. The method of claim 1 further comprising balancing a load between each of the most efficient one of said plurality of paths for each of said file recipients.

11. A file routing system for routing one or more files located on one source to a plurality of file recipients coupled by a plurality of paths in one or more networks comprising:
    a file location list for maintaining said file, wherein said file location list stores one or more network addresses of said source and said file recipients are stored;
    bi-directional messaging between said file routing systems and one or more computing platforms acting as said file recipient to monitor a presently active status of said plurality of file recipients for monitoring;
    a module coupled with each of said plurality of file recipients to evaluate a plurality of predetermined utility functions that determines a most efficient of said plurality of paths to use for routing said one of said one or more files to said file recipient with active file status;
    said module effecting the routing of one of said one or more files to each of the plurality of file recipients using said most efficient one of said plurality of paths and updating said file location list to reflect said routing.

12. The system of claim 11 wherein one of the utility functions is the estimated operating expense associated with said routing of one of said one or more files to each of said file recipients.

13. The system of claim 11 wherein one of the utility functions is the estimated return on investment for improving said routing of one of said one or more files to each recipient relative to using another of said one or more paths.

14. The system of claim 11 wherein one of the utility functions is related to an estimated file transfer time to each of said file recipients.

15. The system of claim 14 wherein said utility function is based on quality of experience for a given file transfer.

16. The system of claim 14 wherein said utility function is based on expected transfer bit rate for a given file transfer.

17. The system of claim 14 wherein a system is used to record a plurality of historical utility metrics associated with the routing of one of said one or more files to each of said file recipients.

18. The system of claim 11 wherein said evaluating comprises one or more scaling factors to adjust the relative importance between two or more utility functions.

19. The system of claim 11 wherein said evaluating is done probabilistically based on said historical metrics.

20. The system of claim 11 further comprising balancing a load between each of the most efficient one of said plurality of paths for each of said file recipients.

* * * * *